(12) United States Patent
Kubota

(10) Patent No.: US 7,720,271 B2
(45) Date of Patent: May 18, 2010

(54) ESTIMATION OF SOLITARY PULMONARY NODULE DIAMETERS WITH REACTION-DIFFUSION SEGMENTATION

(75) Inventor: Toshiro Kubota, Malvern, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 925 days.

(21) Appl. No.: 11/398,100

(22) Filed: Apr. 4, 2006

(65) Prior Publication Data
US 2006/0228014 A1 Oct. 12, 2006

Related U.S. Application Data

(60) Provisional application No. 60/669,415, filed on Apr. 8, 2005.

(51) Int. Cl.
*G06K 9/00* (2006.01)
(52) U.S. Cl. ............... 382/131; 382/128; 382/173; 382/224; 378/15; 378/62
(58) Field of Classification Search ........... 382/128, 382/131, 173, 224; 378/62, 8, 15, 901
See application file for complete search history.

(56) References Cited

U.S. PATENT DOCUMENTS

| | | | | |
|---|---|---|---|---|
| 5,936,628 | A * | 8/1999 | Kitamura et al. | 345/420 |
| 6,631,284 | B2 * | 10/2003 | Nutt et al. | 600/427 |
| 6,891,922 | B2 * | 5/2005 | Ferrant et al. | 378/62 |
| 7,187,800 | B2 * | 3/2007 | Hibbard | 382/173 |
| 7,356,173 | B2 * | 4/2008 | Wiemker et al. | 382/128 |
| 7,590,273 | B2 | 9/2009 | Kubota et al. | |
| 2004/0105527 | A1 * | 6/2004 | Ferrant et al. | 378/210 |
| 2008/0137970 | A1 * | 6/2008 | Kubota | 382/224 |

FOREIGN PATENT DOCUMENTS

WO WO2004109580 A2 12/2004

OTHER PUBLICATIONS

Three-Dimensional Segmentation and Growth-Rate Estimation of Small Pulmonary Nodules in Helical CT Images, 2003.*
Estimating Diameters of Pulmonary Nodules with Competition-Diffusion and Robust Ellipsoid Fit, 2005.*
CT Screening for lung cancer: Frequency and Significaance of part-solid and non-solid nodules, 2002.*

(Continued)

*Primary Examiner*—Wesley Tucker
*Assistant Examiner*—Nancy Bitar

(57) ABSTRACT

A reactive-diffusion method for estimating a diameter of an object of interest includes providing a volume of interest including a plurality of voxels, initializing at least two volumes of the volume of interest, wherein each of the voxels has at least two values corresponding to the at least two volumes of the volume of interest, respectively, performing a diffusion operation and a reaction operation on the voxels to adjust the at least two values, comparing, for each voxel, the at least two values to a threshold to assign each voxel to one of the at least two volumes, wherein the assignment of the voxels is a segmentation result, and estimating a diameter of the object of interest from the segmentation result, wherein the object of interest is represented by at least one of the at least two volumes but less than all the volumes.

16 Claims, 4 Drawing Sheets

OTHER PUBLICATIONS

Binsheng Zhao, et al. *"Automatic Detection of Small Lung Nodules on CT Utilizing a Local Density Maximum Algorithm"* Journal of Applied Clinical Medical Physics, vol. 4, No. 3, Summer 2003, pp. 248-260.

Toshiro Kubota, et al. *"Reaction-Diffusion Systems for Hypothesis Propagation"*, pp. 1-4.

Claudia I. Henschke, et al. *"CT Screening for Lung Cancer: Frequency and Significance of Part-Solid and Nonsolids Nodules,"* AJR: 178, May 2002, pp. 1053-1057.

Tek et al., "Volumetric Segmentation of Medical Images by Three-Dimensional Bubbles", Computer Vision and Image Understanding, Academic Press, San Diego, CA, US, vol. 65, No. 2, Feb. 1997, pp. 246-258.

Okada et al., "Robust 3D Segmentation of Pulmonary Nodules in Multislice CT Images", Lecture Notes in Computer Science, Springer Verlag, Berlin, DE, vol. 3217, Sep. 26, 2004, pp. 881-889.

Rogowska, "Overview and Fundamentals of Medical Image Segmentation", Handbook of Medical Imaging Processing and Analysis, 2000, pp. 69-85.

\* cited by examiner

ESTIMATION OF SOLITARY PULMONARY NODULE DIAMETERS WITH REACTION-DIFFUSION SEGMENTATION

CROSS-REFERENCE TO RELATED APPLICATIONS

This application claims the benefit of Provisional Application No. 60/669,415 filed on Apr. 8, 2005 in the United States Patent and Trademark Office, the contents of which are herein incorporated by reference in its entirety.

BACKGROUND OF THE INVENTION

1. Field of the Invention

The present disclosure relates to image processing, and more particularly to a system and method for estimating a size of solitary objects in of interest in medical images.

2. Description of Related Art

Measuring the size of pulmonary nodules from X-ray computed tomography (CT) data is an important practice for diagnosis and progression analysis of lung cancer. The nodule size often plays an important role in choosing a proper patient care, and is also an effective feature to separate true nodules form nodule-like spurious findings. Typically, the size is represented by the diameter of the nodule. Automating this task for computer-aided diagnosis (CAD) is, however, a difficult problem due to intensity variations, partial volume effects, attachment to other structures, and noises.

A Ct-based screening protocol specified by the International Early Lung Cancer Action Program (I-ELCAP) details how the diameter of pulmonary nodules should be measured and how the measurements should be used for determining the patient management. According to the protocol, the result of an initial CT screening of lung is considered positive if at least one solid or part-solid nodule with 5.00 mm or more in diameter or at least one non-solid nodule with 8.0 mm or more in diameter is found. Although these 5 mm and 8 mm thresholds are likely to drop as more accurate screening becomes possible with high resolution multi-detector helical CT (MDCT), the importance of module size in cancer diagnosis will stay unchanged.

To this end, an automated size estimation algorithm using a Gaussian Ellipsoid Fit (EF) has been developed. Given a marker positioned near a nodule, the algorithm computes the location, orientation and radii of an ellipsoid that models closely the intensity variation nearby the marker. It employs mean-shift and scale estimator to find the solution. The volume and diameter of the nodule can be estimated from the ellipsoid. EF can be incorporated into a CAD system where markers and provided from either manual markings of a reader or the detection algorithm of the system. The accuracy of the estimates has been verified using a large database with manual size measurements. However, the technique tends to have difficulties with small nodules due mainly to the small sample size problem.

SUMMARY OF THE INVENTION

According to an embodiment of the present disclosure, a reactive-diffusion method for estimating a diameter of an object of interest comprises providing a volume of interest comprising a plurality of voxels and including the object of interest, and initializing at least two volumes of the volume of interest, wherein each of the plurality of voxels has at least two values corresponding to the at least two volumes of the volume of interest, respectively. The method further includes performing, iteratively, a diffusion operation and a reaction operation on the plurality of voxels to adjust the at least two values, comparing, for each voxel, the at least two values to a threshold to assign each voxel to one of the at least two volumes, wherein the assignment of the plurality of voxels is a segmentation result, and estimating a diameter of the object of interest from the segmentation result, wherein the object of interest is represented by at least one of the at least two volumes but less than all the volumes.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

According to an embodiment of the present disclosure, a method for extracting a pulmonary nodule and estimating its diameter from helical thoracic CT scans. A rough location of the nodule is assumed to be given by either a reader or a computer aided diagnosis program. A combination of two segmentation methods: reaction-diffusion system (RD) and ellipsoid fit (EF) may be implemented. RD is used on solitary nodules and EF of non-solitary nodules. The solitary/non-solitary nodule type is determined with manual measurements of over 1300 nodules taken form over 240 CT volumes. The performance of the hybrid approach is compared with a local density maximum algorithm, RD, and EF. The experiments show that the hybrid technique provides the most accurate size estimates, and reduces the computation time of EF by 50%.

Segmentation

Figure 1A:
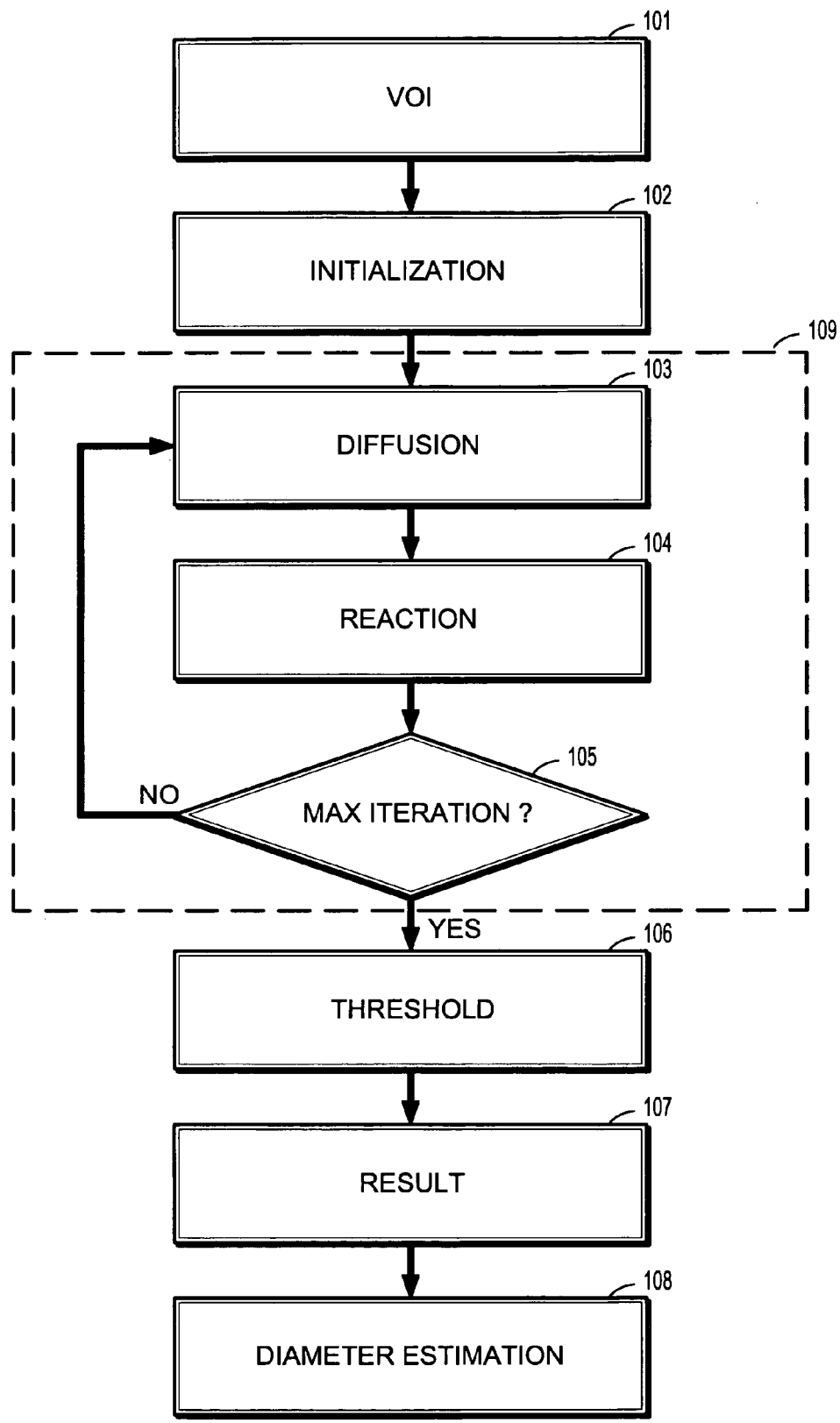
FIG. 1A is a flow chart of a method for reactive-diffusion segmentation according to an embodiment of the present disclosure.

Referring to FIG. 1, according to an embodiment of the present disclosure, a reactive-diffusion system implements a segmentation algorithm that labels each voxel of an inputted volume of interest (VOI) (see block 101) to either foreground or background. Although a system may implemented more than two labels, the discussion is of a two-label system for simplicity. With RD segmentation, each voxel of the input volume to the segmentation accompanies two values: $x_0(s)$ and $x_1(s)$ where s denotes the location of the voxel. They take continuous values with the following constraints: $x_0(s) \geq 0, x_1(s) \geq 0$, and $x_0(s)+x_1(s)=1$ for all s. These are background and foreground labels, respectively. A set of background labels forms a background volume, and a set of foreground labels forms a foreground volume.

The background and foreground volumes are initialized at block 102. The initialization scheme is task dependent, and for the nodule segmentation task, we choose the following formula for each label.

$$x_1(1) = e^{-2(1-min(1,I(s)/1000))^2} \quad (1)$$

and $x_0(s) = 1 - x_1(s)$ where $I(s)$ denotes the CT value of the input volume at the locations $s$, and 1000 is near the upper CT value of non-calcified pulmonary nodules. Hence for voxels with $I \geq 1000$, $x_1 = 1$ and $x_0 = 0$. For voxels with $I < 1000$, $x_1$ decreases monotonically as $I$ deviates from 1000 while $x_0$ increases. $x_1$ takes the minimum value of $e^{-2}$ when $I = 0$.

After the initialization 102, the background and foreground volumes undergo diffusion 103 and reaction 104 phases alternately for a number of times 105 (109). During the diffusion phase, these volumes are diffused separately over the spatial domain. A linear diffusion 103 may be used, such as, $$x\dot{Y}(s) = \lambda \nabla^2 x_i(s) \quad (2)$$

where $i \in \{0,1\}$ and the diffusion rate $\lambda$ is set to 0.5.

During the reaction phase 104, $x_0(s)$ and $x_1(s)$ compete against each other. The competition is implemented in a form of replicator dynamics as shown below.

$$x_i \dot{Y}(s) = \mu x_i(s)((Ax(s))i - x^T(s)Ax(s))) \quad (3)$$

where $i \in \{0,1\}$, $x(s) = (x_0(s)x_1(s))^T$, $\mu$ is the reaction rate, $(Ax(s))_i$ denotes ith row of $Ax(s)$, and A is a fitness matrix. For experiments, a 2×2 identity matrix was used as A. More complex matrices may be used for other tasks. The update rate is set to $x(s)^T Ax(s))^{-1}$. Then, $$x_i(s) = x_i(s)(Ax(s))_i (x^T(s)Ax(s))^{-1}. \quad (4)$$

The above replicator dynamics make sure that $x_0 \geq 0, x_1 \geq 0$, and $x_0 + x_1 = 1$, and constantly increases the average fitness value until it reaches the local maximum where each label becomes either 0 or 1. The diffusion process 103 encourages spatial homogeneity and adds disturbance to break a tie in the reaction phase 104. After a few iterations, the outcome of the competition becomes clear and thresholding can be applied 106 at 0.5 on $x_1$ to obtain the segmentation result 107. In experiments the diffusion and the reaction phases were applied alternatively for four iterations 105. Other numbers of iterations may be implemented.

According to an embodiment of the present disclosure, a Gaussian ellipsoid fit (EF) system implements a method which, given a marker positioned near a target nodule, fits a 3D anisotropic Gaussian function to the nodule's intensity distribution in a multiscale fashion. An ellipsoid that approximates the nodule's boundary is derived as a specific equal-probability contour of the fitted Gaussian. Various nodule size features (e.g., maximum diameter, volume, sphericity) are determined analytically from radii of the ellipsoid. The multiscale analysis is given by considering a Gaussian scale space of the input sub-volume with a set of discrete analysis scales in an increasing order, performing a Gaussian model fitting at each analysis scale, and find the most stable estimate among the multiscale estimates by minimizing a form of Jensen Shannon divergence criterion. At each scale, Gaussian mean as the nodule center location is estimated by the convergence of the scale mean shift procedures. In the neighborhood of the estimated mean, local data analysis is performed by the mean shift procedures initialized at a set of neighboring points. Gaussian covariance matrix as the anisotropic spread is estimated by the constrained least-squares solution of a linear system constructed with the convergent mean shift vectors. Parameter settings may be selected and varied depending on an application. For example, for the experiments described herein, the scale space is conceived with 18 analysis scales with 0.25 interval ($0.5^2, \ldots, 4.75^2$). And 35% 3D confidence ellipsoid is used for deriving an equal-probability contour from the fitted Gaussian.

The local distribution maximum applies thresholding at multiple levels followed by connected component analysis on each thresholded volume. It then searches for object and their plateaus in the multiple thresholded volumes sequentially, starting from the one with the highest threshold value in the order of descending threshold values. A new object is found when a connected component has no overlaps to components in the previous volume. An object becomes a plateau when the ratio between the volume of the object and the volume of its bounding box suddenly decreases by more than some fraction (e.g., $\eta$) or the object merges with another plateau. Parameters of the method include the threshold values and $\eta$. $\eta$ was set to 1/30 and the threshold levels were set to 0, 100, 200, ..., 1100. Other parameter values may be selected.

The I-ELCAP protocol may be implemented for diameter estimation 108 wherein the diameter of a nodule is estimated as the average length and width where length is measured on a single CT image that shows the maximum length from among a plurality of segments of a segmenation; and width is defined as the longest perpendicular to the length of a segment having the maximum length. The CT image is selected along the axial direction, due to high-resolution and isotropic nature of the axial view. The I-ELCAP protocol may be implemented to estimate the diameter from the segmentation. Other measures of diameter may be implemented.

For LDM and RD, the diameter of a nodule is estimated as follows. After the segmentation and connected component analysis, the component that is closest to the marker is selected as the one corresponding to the nodule at the marker. In most cases, the marker is contained within the component, but in some cases, it points to the background due to inaccuracy in marker positioning. Next, the component is analyzed slice by slice in the axial view. For each axial slice, 2D connected component analysis is performed, an ellipse is fitted to each component, and the geometrical mean of the axes is recorded for each ellipse. Among all 2D connected components, we select the one with the maximum geometrical mean for diameter measurement. The diameter is then estimated as the average width and height of the bounding box enclosing the selected component. Use of the geometrical mean instead of the arithmetic mean gives a slightly better agreement with the manual measurements.

For EF, the diameter is estimated as follows. First, an ellipsoid directly derived from the estimated covariance is projected on the axial plane, and the radii of the ellipse on the projection plane is determined. The diameter can be estimated, for example, as the arithmetic mean of the radii times the scaling constant of 1.6416 corresponding to the 35% confidence limit.

Figure 1B:
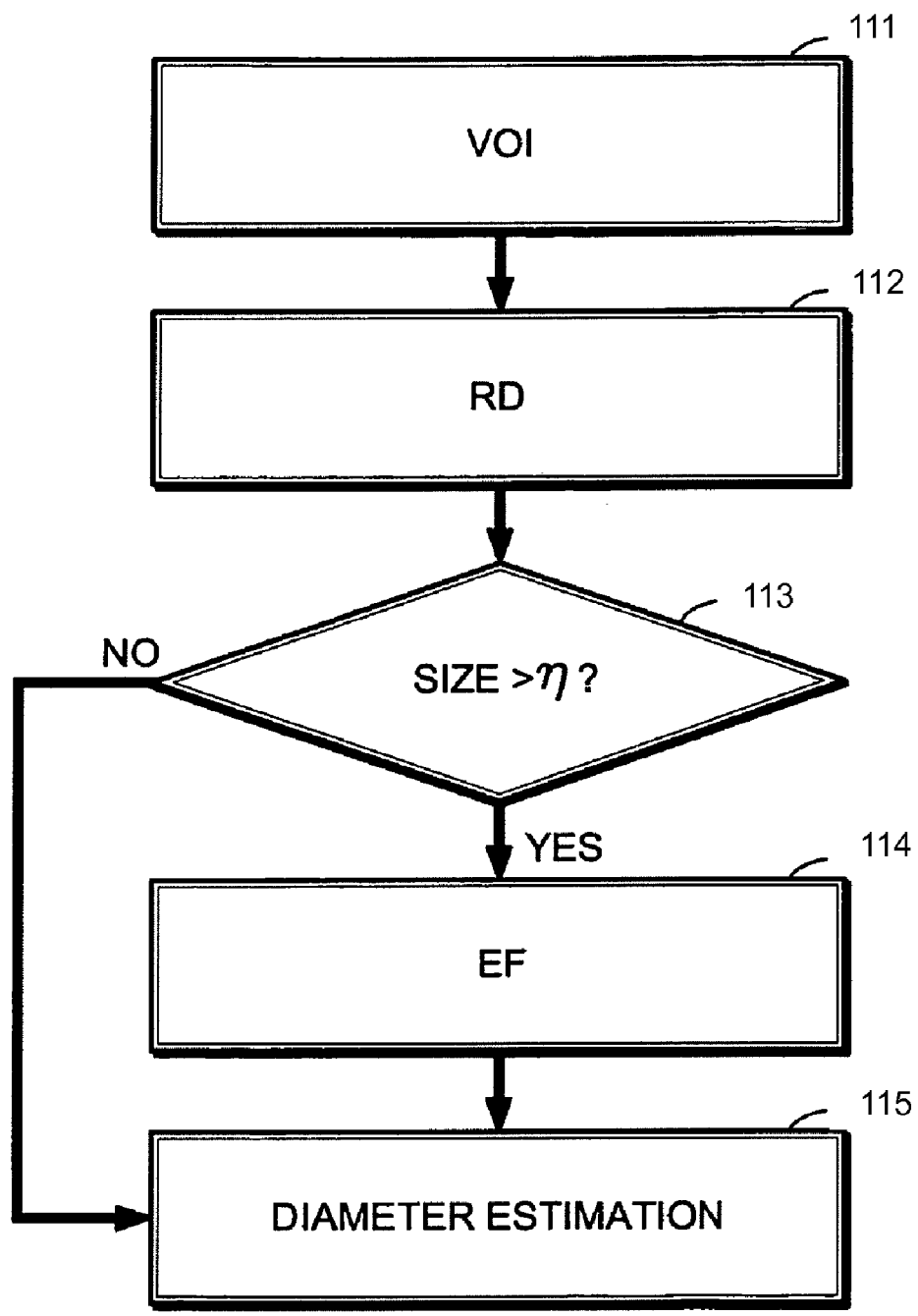
FIG. 1B is a flow chart of a method for hybrid segmentation according to an embodiment of the present disclosure.

Referring to FIG. 1B, according to an embodiment of the present disclosure, for a hybrid method, when a nodule is attached to another structure, RD segments both the nodule and structure together, resulting in a large volume. This segmentation volume usually stretches out to the boundary of the bounding volume (21×21×21 in our experiments). This observation leads to a test for the nodule type: if the segmentation volume touches one of six boundaries of the bounding volume, it is considered non-solitary. Otherwise, it is considered solitary. The ratio between the segmentation volume and the volume of the bounding box enclosing the segmentation is determined to check if the segmentation has a reasonably spherical shape. In experiments, only the boundary check was used to determine if the nodule is solitary.

By using this solitary/non-solitary check of a nodule with RD segmentation, a hybrid approach to the diameter estimation problem can be implemented. For each given marker of a VOI 111, a sub-volume of 21×21×21 voxels were extracted, and RD segmentation 112 is applied to the volume. A boundary check 113 is applied to the segmentation 112 if the boundary check indicates the nodule to be solitary, a diameter estimation 115 is applied on the RD segmentation 112. Otherwise, EF 114 is applied on the sub-volume and the diameter is estimated 115. This hybrid approach is denoted HB.

Referring now to the experiments discussed herein; the performance of HB has been evaluated in estimating the diameter of pulmonary nodules. HB has been compared against EF, LDM and RD. Centered at each marker placed by radiologists near a pulmonary nodule, a 21×21×21 bounding volume was extracted and used as an input to the segmentation processes.

EF has difficulties in processing small nodules as the sample size for the estimate is small. EF can also mistakenly include surrounding background for the estimate, which leads to overestimate of the diameter.

A problem associated with LDM is its sensitivity to the pre-determined threshold levels, which are typically set by a fixed increment. The segmentation of an object becomes inaccurate when the intensity distribution of the object has an overlap with the distribution of its plateau. The degree and the frequency of the problem can be reduced by increasing the number of threshold levels, but at the cost of increasing the computational load.

RD is effective in estimating the diameter of solitary modules.

Figure 2A:
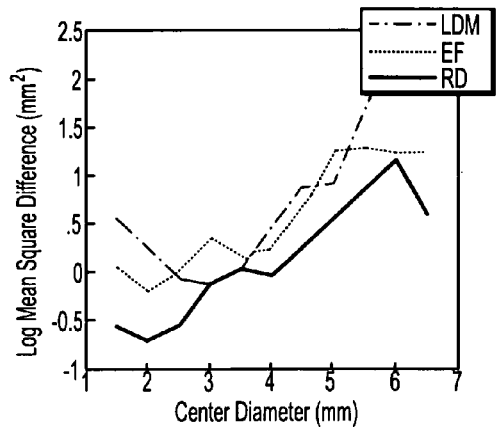
FIGS. 2A-B are graphs of an estimate of performance of EF, LDM, and RD for solitary nodules according to an embodiment of the present disclosure.
Figure 2B:
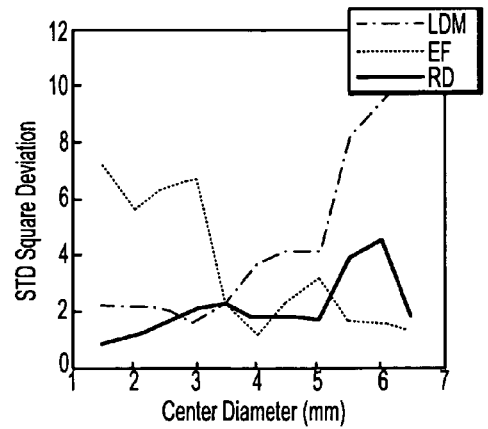
Figure 3A:
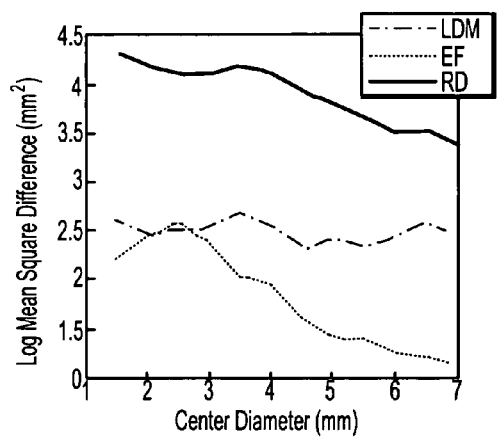
FIG. 3A-B are graphs of an estimate of performance of EF, LDM, and RD for non-solitary nodules according to an embodiment of the present disclosure.
Figure 3B:
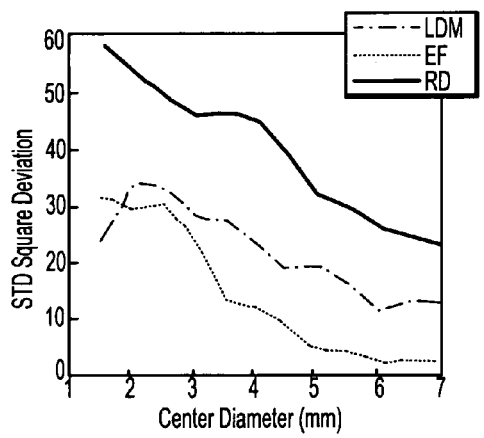

The accuracy of the estimates were evaluated quantitatively by comparing them with manual measurements by human experts (both radiologists and scientists in the medical imaging field). We use 1349 nodules taken from over 240 CT volumes for the evaluation. The 1349 nodules are divided into 614 solitary and 735 non-solitary ones using the boundary test with the RD segmentation. The performance of EF, LDM, and RD were evaluated on solitary and non-solitary nodules separately. The accuracy is measured by the squared difference between estimates and the corresponding manual measurements. FIGS. 2 and 3 show the results for solitary and non-solitary nodules, respectively. In the plot, the mean and standard deviation of the squared difference errors are evaluated among nodules whose manual measurements are with ±0.5 of the center diameter (placed at a 0.5 mm increment between 1.0 and 7.0). The mean is shown in log scale to improve the visibility of the data while the deviation is shown in linear scale. The purpose is to analyze the performance in terms of the nodule diameter.

For solitary nodules, the error tends to increase with the center diameter of the analysis. This, it is more informative to compare the results with the error normalized by the center diameter. RD is more accurate than EF and LDM across all sizes except at 3 mm where LDM with 0.2913 normalized error is slightly better than RD with 0.2972 normalized error. For non-solitary nodules, RD is the least accurate and EF is the most accurate one. For EF and RD, the error tends to decrease with the center diameter, while for LDM, it stays around 2.5 mm$^2$. The error on RD clearly comes from segmentation of both nodule and an attached structure.

Figure 4A:
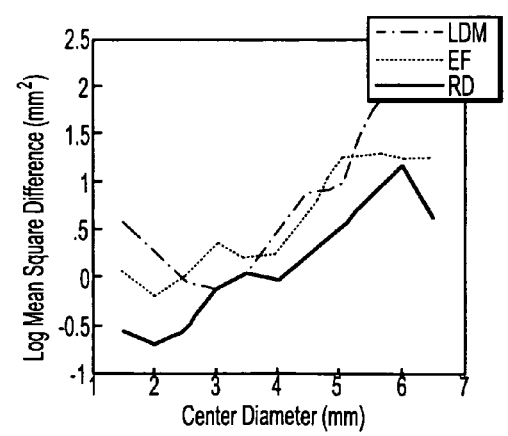
FIG. 4A-B are graphs of an estimate of performance of EF, LDM, and RD for solitary and non-solitary nodules according to an embodiment of the present disclosure.
Figure 4B:
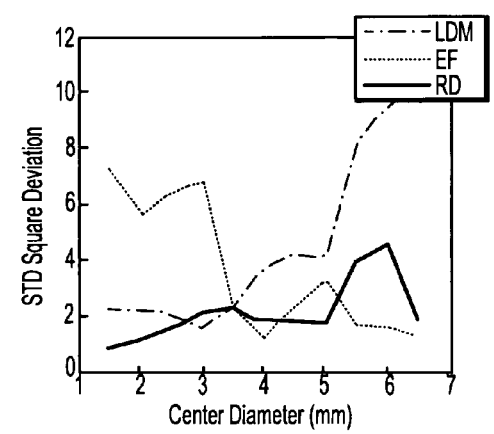

The performance of HB was evaluated using all 1349 nodules. FIG. 4 shows the mean and the standard deviation of the squared difference error for EF, LDM and HB collected within the same diameter ranges as in FIGS. 2 and 3. Both mean and deviation are shown in linear scale. HB constantly gives a smaller error than other methods in all sizes. This is predicted as HB uses RD and EF for solitary and non-solitary nodules, respectively, and the accuracy of RD and EF in their respective categories has been verified. Table 1 shows the mean and standard deviation of the computation time for each estimation technique. As shown, RD is computationally most efficient while EF is computationally most expensive. HB is about 50% faster than EF.

TABLE 1

| | Computational Time (seconds) | | | |
|---|---|---|---|---|
| | METHOD | | | |
| | EF | LDM | RD | HB |
| Mean | 1.26 | 0.269 | 0.0510 | 0.651 |
| Std. Dev. | 0.25 | 0.18 | 0.014 | 0.7 |

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 5:
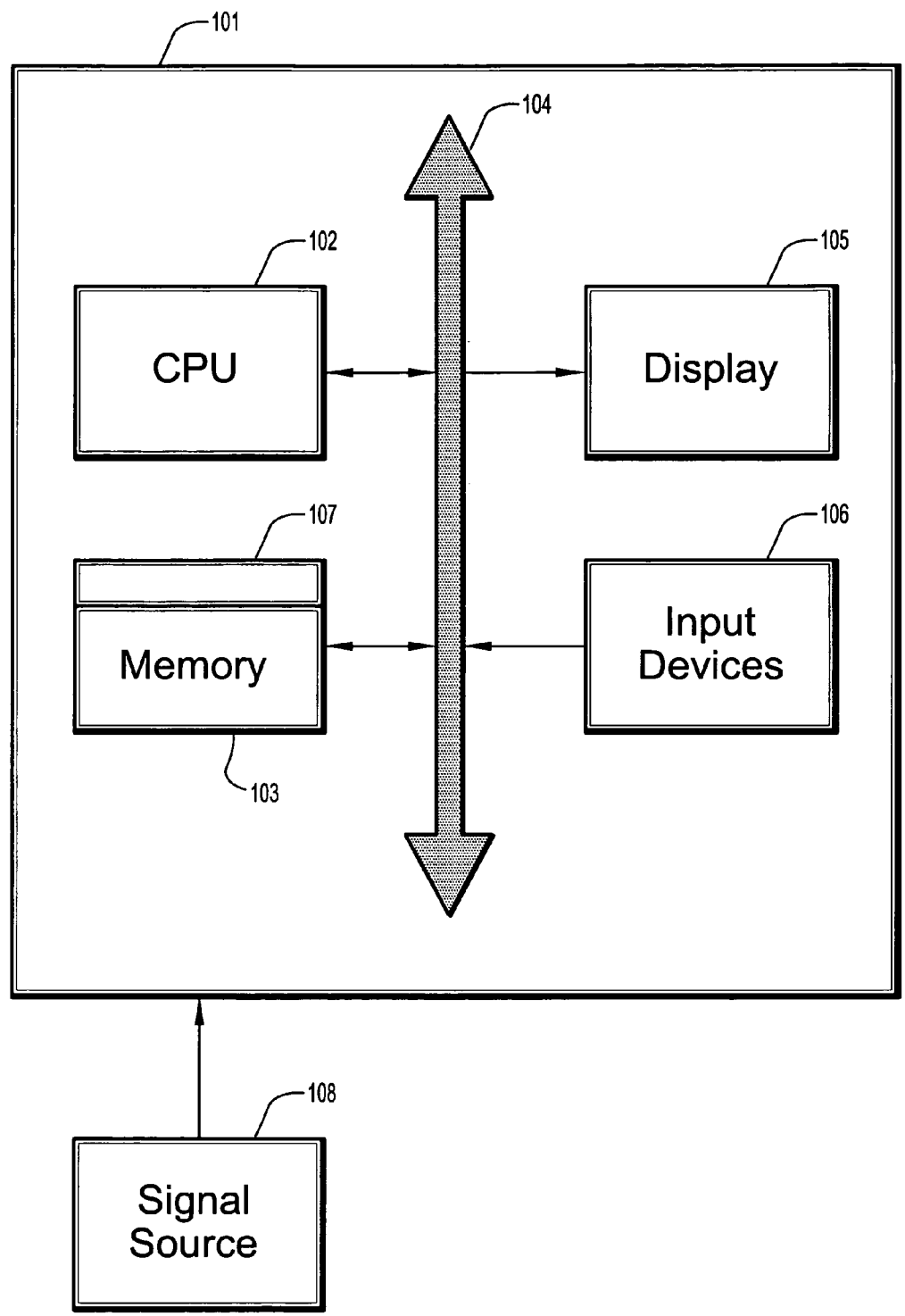
FIG. 5 is a diagram of a computer system for implementing a method according to an embodiment of the present disclosure.

Referring to FIG. 5, according to an embodiment of the present disclosure, a computer system 501 for implementing a method for estimating solitary pulmonary nodule diameter with reactive-diffusion segmentation can comprise, inter alia, a central processing unit (CPU) 502, a memory 503 and an input/output (I/O) interface 504. The computer system 501 is generally coupled through the I/O interface 504 to a display 505 and various input devices 506 such as a mouse and keyboard. The support circuits can include circuits such as cache, power supplies, clock circuits, and a communications bus. The memory 503 can include random access memory (RAM), read only memory (ROM), disk drive, tape drive, etc., or a combination thereof. The present invention can be implemented as a routine 507 that is stored in memory 503 and executed by the CPU 502 to process the signal from the signal source 508. As such, the computer system 501 is a general-purpose computer system that becomes a specific purpose computer system when executing the routine 507 of the present invention.

The computer platform 501 also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present disclosure provided herein, one of ordinary skill in the related art will be able to contemplate these and similar implementations or configurations.

Having described embodiments for a system and method for estimating solitary pulmonary nodule diameter with reactive-diffusion segmentation, it is noted that modifications and variations can be made by persons skilled in the art in light of the above teachings. It is therefore to be understood that changes may be made in embodiments of the present disclosure that are within the scope and spirit thereof.

What is claimed is:

1. A computer-implemented reactive-diffusion method for estimating a diameter of an object of interest comprising: a computer to implement the steps of:
   providing a volume of interest comprising a plurality of voxels and including the object of interest;
   initializing at least two volumes of the volume of interest, wherein each of the plurality of voxels has at least two values corresponding to the at least two volumes of the volume of interest, respectively;
   performing, iteratively, a diffusion operation and a reaction operation on the plurality of voxels to adjust the at least two values;
   comparing, for each voxel, the at least two values to a plurality of thresholds to assign each voxel to one of the at least two volumes, wherein the assignment of the plurality of voxels is a segmentation result, wherein the object of interest is detected by comparing connected components determined at sequentially lower thresholds of the plurality of thresholds to determining the object of interest at one of the plurality of thresholds, the object of interest being a connected component having no overlaps to another component determined at a previous threshold; and
   estimating a diameter of the object of interest from the segmentation result, wherein the object of interest is represented by at least one of the at least two volumes but less than all the volumes.

2. The computer-implemented reactive-diffusion method of claim 1, wherein the at least two volumes include a foreground volume and a background volume.

3. The computer-implemented reactive-diffusion method of claim 2, wherein the at least two values correspond to a foreground label and a background label, respectively.

4. The computer-implemented reactive-diffusion method of claim 1, wherein a number of iterations of the performing of the diffusion and reaction operations is predetermined.

5. The computer-implemented reactive-diffusion method of claim 1, wherein performing the diffusion operation comprises performing a linear diffusion.

6. The computer-implemented reactive-diffusion method of claim 5, wherein the linear diffusion is given by $x\dot{Y}(s)=\lambda\nabla^2 x_i(s)$, where $i\in\{0,1\}$ and the diffusion rate $\lambda$ is set to 0.5.

7. The computer-implemented reactive-diffusion method of claim 1, wherein performing the reaction operation comprises performing a competition between the at least two values in a form of replicator dynamics implementing a fitness matrix, wherein the replicator dynamics updates the at least two values.

8. The computer-implemented reactive-diffusion method of claim 7, wherein performing the reaction operation comprises enforcing that each of the at least two values is greater than or equal to zero and the product of the at least two values is one.

9. The computer-implemented reactive-diffusion method of claim 8, wherein the diffusion operation adds disturbance to break a tie between the at least two values in the reaction operation.

10. A computer readable medium embodying a program of instructions executable by a processor to perform method steps for a reactive-diffusion method for estimating a diameter of an object of interest, the method steps comprising:
    providing a volume of interest comprising a plurality of voxels and including the object of interest;
    initializing at least two volumes of the volume of interest, wherein each of the plurality of voxels has at least two values corresponding to the at least two volumes of the volume of interest, respectively;
    performing, iteratively, a diffusion operation and a reaction operation on the plurality of voxels to adjust the at least two values;
    comparing, for each voxel, the at least two values to a plurality of thresholds to assign each voxel to one of the at least two volumes, wherein the assignment of the plurality of voxels is a segmentation result, wherein the object of interest is detected by comparing connected components determined at sequentially lower thresholds of the plurality of thresholds to determining the object of interest at one of the plurality of thresholds, the object of interest being a connected component having no overlaps to another component determined at a previous threshold; and
    estimating a diameter of the object of interest from the segmentation result, wherein the object of interest is represented by at least one of the at least two volumes but less than all the volumes.

11. A computer-implemented reactive-diffusion method for estimating a diameter of an object of interest comprising: a computer to implement the steps of:
    providing a volume of interest comprising a plurality of voxels and including the object of interest;
    initializing at least a foreground volume and a background volume of the volume of interest, wherein each of the plurality of voxels has a plurality of values corresponding to the foreground volume and the background volume, respectively, wherein the plurality of values indicate whether a voxel is likely to belong to the foreground volume or the background volume;
    performing a diffusion operation and a reaction operation on the plurality of voxels;
    updating the plurality of values;
    comparing for each voxel, the plurality of values to a plurality of thresholds to assign each voxel to one of the foreground volume or the background volume, wherein the assignment of the plurality of voxels is a segmentation result, wherein the object of interest is detected by comparing connected components determined at sequentially lower thresholds of the plurality of thresholds to determining the object of interest at one of the plurality of thresholds, the object of interest being a connected component having no overlaps to another component determined at a previous threshold; and
    estimating a diameter of the object of interest from the segmentation result, wherein the object of interest is represented by the foreground volume.

12. The computer-implemented reactive-diffusion method of claim 11, wherein the diffusion and reaction operations are performed iteratively for a is predetermined number of iterations.

13. The computer-implemented reactive-diffusion method of claim 11, wherein performing the diffusion operation comprises performing a linear diffusion.

14. The computer-implemented reactive-diffusion method of claim 11 wherein performing the reaction operation comprises performing a competition between the plurality of values in a form of replicator dynamics implementing a fitness matrix, wherein the replicator dynamics updates the plurality of values.

15. The computer-implemented reactive-diffusion method of claim 14, wherein the diffusion operation adds disturbance to break a tie between the at least two values in the reaction operation.

16. The computer-implemented reactive-diffusion method of claim 11, wherein each of the plurality of values is greater than or equal to zero and the product of the plurality of values is one.

* * * * *